United States Patent
Scherba et al.

(10) Patent No.: US 12,405,619 B2
(45) Date of Patent: Sep. 2, 2025

(54) METHOD AND SYSTEM FOR DYNAMICALLY CONTROLLING A SLIDE-OUT ASSEMBLY

(71) Applicant: Valid Manufacturing Ltd., Salmon Arm (CA)

(72) Inventors: Justin Paul Scherba, Salmon Arm (CA); Jack William Fenkhuber, Salmon Arm (CA); Luke Wilfred Heckrodt, Salmon Arm (CA)

(73) Assignee: Valid Manufacturing Ltd (CA)

( * ) Notice: Subject to any disclaimer, the term of this patent is extended or adjusted under 35 U.S.C. 154(b) by 399 days.

(21) Appl. No.: 17/822,351

(22) Filed: Aug. 25, 2022

(65) Prior Publication Data
US 2023/0063581 A1 Mar. 2, 2023

Related U.S. Application Data

(60) Provisional application No. 63/237,742, filed on Aug. 27, 2021.

(30) Foreign Application Priority Data

Aug. 27, 2021 (CA) ................................. CA 3129134

(51) Int. Cl.
*G05D 3/20* (2006.01)
*B60P 3/34* (2006.01)

(52) U.S. Cl.
CPC ................ *G05D 3/203* (2013.01); *B60P 3/34* (2013.01)

(58) Field of Classification Search
None
See application file for complete search history.

(56) References Cited

U.S. PATENT DOCUMENTS

| | | | |
|---|---|---|---|
| 5,248,180 A | 9/1993 | Hussaini | |
| 6,265,843 B1 * | 7/2001 | West | G05B 19/40 318/624 |
| 6,345,854 B1 | 2/2002 | McManus | |
| 6,471,275 B1 | 10/2002 | Kunz et al. | |
| 6,536,823 B2 | 3/2003 | McManus | |
| 6,696,813 B2 | 2/2004 | McManus et al. | |
| 6,894,447 B1 | 5/2005 | Friede et al. | |
| 8,016,343 B2 | 9/2011 | Schwindaman et al. | |
| 8,141,927 B2 | 3/2012 | Kreil | |

(Continued)

FOREIGN PATENT DOCUMENTS

AU 2010246535 B2 2/2015

*Primary Examiner* — Daniel L Greene
(74) *Attorney, Agent, or Firm* — Spencer Fane, LLP

(57) ABSTRACT

A method for detecting and dynamically updating an end stop position of a slide-out assembly comprises the steps of: synchronizing a movement of each of at least two slide-out actuators during an extension operation; detecting a decreased speed of each slide-out actuator of the said at least two slide-out actuators; stopping each of the at least two slide-out actuators when the speed reaches an end-stop position threshold; comparing a travel distance of the at least two slide-out actuators to the said last saved travel distance; and updating the said last saved travel distance to a new saved travel distance, if the travel distance is greater than or less than the last saved travel distance. A control system for detecting and dynamically updating the end stop position is also provided.

16 Claims, 5 Drawing Sheets

(56) References Cited

U.S. PATENT DOCUMENTS

| | | | |
|---|---|---|---|
| 8,235,455 B2 | 8/2012 | Schwindaman et al. | |
| 8,240,744 B2 | 8/2012 | Schwindaman et al. | |
| 8,317,250 B2 | 11/2012 | Schwindaman et al. | |
| 8,402,660 B1* | 3/2013 | Johnson | B60P 1/433 29/897.2 |
| 8,573,666 B2 | 11/2013 | Schwindaman et al. | |
| 8,581,540 B2 | 11/2013 | Schwindaman et al. | |
| 9,007,012 B2 | 4/2015 | Schwindaman et al. | |
| 9,193,291 B2 | 11/2015 | Schwindaman et al. | |
| 9,694,733 B2 | 7/2017 | Schwindaman et al. | |
| 10,471,878 B2 | 11/2019 | Schwindaman et al. | |
| 2004/0002777 A1* | 1/2004 | Grossmann | G05B 19/4061 700/56 |
| 2004/0017170 A1* | 1/2004 | Endo | G05B 19/416 318/272 |
| 2012/0035813 A1 | 2/2012 | Kreil | |
| 2015/0318772 A1* | 11/2015 | Jahshan | B60L 50/40 318/400.41 |
| 2016/0068094 A1 | 3/2016 | Schwindaman et al. | |
| 2020/0047658 A1 | 2/2020 | Schwindaman et al. | |

* cited by examiner

METHOD AND SYSTEM FOR DYNAMICALLY CONTROLLING A SLIDE-OUT ASSEMBLY

CROSS-REFERENCE TO RELATED APPLICATIONS

This application claims priority to U.S. patent application No. 63/237,742 and Canadian patent application no. 3,129,134, both entitled METHOD AND SYSTEM FOR DYNAMICALLY CONTROLLING A SLIDE-OUT ASSEMBLY and both filed on Aug. 27, 2021, the entirety of each application being incorporated herein by reference.

FIELD

The present disclosure relates to control systems and methods for controlling slide-out assemblies; in particular, this disclosure relates to control systems and methods for controlling the actuators of slide-out assemblies for extended living space, such as in recreational vehicles.

BACKGROUND

Mobile living spaces, which include recreational vehicles such as trailers, mobile homes and the like, often feature slide-out rooms for providing increased living space area within the recreational vehicle. Advantageously, slide-out rooms may be extended when the living space is in use, thereby expanding the available interior living space, and then retracted so as to be enclosed within the vehicle when it is time to transport the mobile living space to a new location.

Although slide-out rooms are a desired feature, the mechanical components, including the motors, actuators and slide-out assemblies for extending and retracting the slide-out room often wear out and fail prematurely, and may require increased maintenance to keep these components in good working order.

Often, the control of slide-out rooms is automated, whereby a user initiates the extension or retraction of the slide-out room with a button, switch or control panel. The control system may be provided with a pre-programmed extension distance, otherwise referred to as the "end stop" position. When the slide-out assembly actuator has reached the pre-programmed end stop, the actuators are stopped and the room is in an extended position. However, a disadvantage of systems with pre-programmed end stop positions is that, due to slight variations and tolerances in the dimensions of both the slide-out room walls and the surrounding trailer walls, a pre-programmed extension distance for a given actuator or slide-out assembly may not reflect the true distance that the slide-out assembly is capable of extending to. Furthermore, as there are at least two sets of actuators and slide-out assemblies for each slide-out room, slight differences in each slide-out assembly and corresponding actuator may result in the pre-programmed end stop of one assembly or actuator extending outwardly farther from the surrounding trailer wall, as compared to the end stop of the other assembly or actuator, thereby causing the slide-out room to be angled or crooked when the slide-out room is fully extended or retracted. Additionally, the exterior wall of the slide-out room may not be flush with the rest of the surrounding wall of the vehicle when the slide-out room is fully retracted, which leads to the exterior of the vehicle not being fully sealed and therefore vulnerable to water ingress when the slide-out room is retracted. Additionally, providing full power to the actuators during extension and retraction operations may cause increased wear to the actuators and slide-out assemblies over time.

In prior art slide-out systems, of which the applicant is aware, in U.S. Pat. No. 6,345,854 to McManus et. al, a slide out room for mobile living quarters is retracted by a pair of independent actuators. A control is provided which responds to signals generated by position sensors for each actuator to detect when the position of one actuator exceeds the position of the other actuator by a pre-determined offset. The actuators are stopped when they attain a corresponding in or out stop limit. The stop limits are set by independently advancing the actuators after they have attained a default limit, to set the out and in stop limits independently between the actuators. This updating of the stop positions may typically be performed by a service or repair person.

In U.S. Pat. No. 9,694,733 to Schwindaman et al., the actuating assemblies for the slide-out room include a pair of parallel gear racks mounted on the side wall, which are engaged by pinions rotated by torque shafts mounted on the main living quarters. Each torque shaft is rotated by a separate motor. A controller monitors the speed and the current and voltage draw of the motors; when an overcurrent is detected in one of the motors, indicating a stall condition of the motor, the controller stops that motor and the other motor continues to rotate for a set period of time, so as to synchronize the movement of the two motors and to avoid operating the second motor indefinitely after the first motor has stalled, for example because of an obstruction or because the first slide-out assembly has reached its full extension.

In U.S. Pat. No. 8,141,927 to Kreil, a control system for a slide-out room of a recreational vehicle includes retracted and extended positions of the slide-out room that may be reset by the end user. The end user resets the retracted and extended positions by manually operating each drive motor until the slide-out room reaches the desired retracted or extended position, and then the end user presses a reset button, which causes the control system to store the new extended or retracted position of the slide-out room. The controller monitors the position of each room slide by using a Hall effect sensor or other types of position sensors, such as optical encoders.

SUMMARY

In one aspect of the present disclosure, a control system and method for controlling a slide-out is provided wherein the control system monitors the speed and position of each slide-out assembly, based on position sensors operatively connected to each actuator of each slide-out assembly. As the slide-out assembly actuator nears the end of its travel distance, the speed of the actuator slows down, which is detected by the control system. Once an end stop position is reached by the actuator, the distance travelled by the actuator is compared to a last-saved travel distance, and if the travel distances are different the control system saves the new travel distance as the new end stop position for that actuator. When the control system is first installed, the last saved travel distance of each actuator may be a factory setting. Then, each time the slide-out is extended during use by the end user, the control system automatically detects and updates the travel distance of each actuator, thereby allowing the actuators to reach their full extension distances over time.

In another aspect of the present disclosure, the control system and method may monitor the travel distance of each actuator during an extension or retraction operation, and when each actuator approaches the last-saved travel distance for that actuator, the motor of that actuator is linearly slowed down, for example by pulse-width modulation (PWM). By slowing down the actuator before it reaches its fully retracted or extended position, the control system may thereby reduce the wear and tear on the actuator and the slide-out assembly, which may lead to a longer useful life and reduced maintenance costs for the slide-out room.

The systems and methods described herein utilize a position sensor for monitoring the speed and position of each slide-out assembly, which data is input into the control system for controlling the actuators.

Throughout the present description, systems utilizing encoders as the position sensors are described as illustrative examples. However, it will be appreciated that deploying an encoder for sensing the position of each actuator is intended as an illustrative example only, and shall not limit the scope of the present disclosure to the use of encoders as the position sensors.

In one aspect of the present disclosure, a method for detecting and dynamically updating an end stop position of a slide-out assembly comprises the steps of:
  a) synchronizing a movement of each of at least two slide-out actuators during an extension operation;
  b) when the at least two slide-out actuators approach a last saved travel distance defining an end stop position, detecting a decreased speed of each slide-out actuator of the said at least two slide-out actuators;
  c) stopping each of the at least two slide-out actuators when the speed of each slide-out actuator reaches an end-stop position threshold;
  d) comparing a travel distance of the at least two slide-out actuators to the said last saved travel distance; and
  e) updating the said last saved travel distance to a new saved travel distance, if the travel distance is greater than or less than the last saved travel distance.

In some embodiments, prior to step (c), the method includes the step of detecting a near-end position of the at least two slide-out actuators, the near-end position having a travel distance less than the said last saved travel distance of the at least two slide-out actuators; and reducing the speed of each of the at least two slide-out actuators as the at least two slide-out actuators travel between the said near-end position and the last saved travel distance. In some embodiments, the travel distance of the near-end position is manually selected or programmed into the control system.

In some embodiments, the method further includes the steps of:
  f) synchronizing a movement of each of the at least two slide-out actuators during a retraction operation;
  g) when the at least two slide-out actuators approach a home position, detecting a decreased speed of each slide-out actuator of the at least two slide-out actuators;
  h) stopping each of the at least two slide-out actuators when the speed of each slide-out actuator reaches a home position threshold; and
  i) updating a last saved home position to a present position of each actuator of the at least two slide-out actuators.

In some embodiments, the step of reducing the speed of each of the at least two slide-out actuators comprises controlling the speed of each actuator of the at least two slide-out actuators with a pulse-width modulation controller, wherein the speed is reduced by decreasing a duty cycle of the said pulse-width modulation controller. For example, not intended to be limiting, the cycle of the pulse-width modulation controller is decreased by 30% to 50% of a full power duty cycle so as to reduce the speed of each of the at least two slide-out actuators.

In another aspect, the step of updating the last saved travel distance to a new saved travel distance comprises increasing or decreasing the last saved travel distance by a set amount. In some embodiments, the set amount includes a coarse adjustment amount and a fine adjustment amount, the coarse adjustment amount being greater than the fine adjustment amount. When a differential between the travel distance and the last saved travel distance exceeds the coarse adjustment amount as determined at step (d) of the above method, the last saved travel distance is updated to the new saved travel distance by increasing or decreasing the last saved travel distance by the coarse set amount. When the differential is equal to or less than the coarse adjustment amount as determined at step (d), the last saved travel distance is updated to the new saved travel distance by increasing or decreasing the last saved travel distance by the fine adjustment amount.

In some embodiments of the method, prior to performing step (d) of comparing a travel distance of the at least two slide-out actuators to a last saved travel distance, the method further includes the step of determining whether each actuator of the at least two slide-out actuators was extended from a fully retracted position, and then only proceeding to step (d) if each actuator was extended from the fully retracted position.

In another aspect of the present disclosure, step (a) of synchronizing a movement of each of at least two slide-out actuators during an extension operation comprises:
  i. monitoring a position of each of the at least two slide-out actuators by a position sensor for detecting the distance travelled by each actuator;
  ii. detecting a difference in the position of each said actuator compared to the other actuator; and
  iii. if said difference is detected, linearly reducing a speed of a leading actuator of the said at least two actuators that is ahead of a lagging actuator of the at least said two actuators.

In some embodiments, if the difference is equal to or greater than a maximum threshold difference, then the method further comprises the steps of: stopping the leading actuator until the difference is less than the maximum threshold difference; and re-starting the leading actuator when the difference is less than the maximum threshold difference.

In another aspect of the present disclosure, a control system for performing the methods described herein of detecting and dynamically updating an end stop position of a slide-out assembly, comprises: a controller; a position sensor operatively connected to each slide-out actuator of the at least two slide-out actuators for monitoring a distance travelled by each said actuator, each position sensor in electronic communication with the controller; and a memory configured to store position data of each position sensor, the memory in electronic communication with the controller. The controller synchronizes a movement of each actuator of the at least two slide-out actuators and monitors a position and a speed of each slide-out actuator. Additionally, the controller stops each actuator when the speed of each actuator reaches an end stop position threshold; and the controller compares the travel distance of each actuator to a last saved travel distance of each actuator retrieved from the memory and updates the last saved travel distance to the new travel distance if the new travel distance is greater than or less than the last saved travel distance.

In some embodiments, the controller comprises a pulse-width modulator, and when each slide-out actuator approaches a near-end position, the near-end position defined by a near-end travel distance that is less than the last saved travel distance of each actuator, the pulse-width modulator reduces the duty cycle of each slide-out actuator to reduce the speed of the slide-out actuator as it travels between the near-end position and the last saved travel distance.

In some embodiments, the position sensor is selected from a group comprising: a rotary encoder, a linear encoder, an absolute position sensor, a photoelectric sensor.

In some embodiments, the position sensor is an encoder, and the position data includes encoder counts for determining the position and travel distance of each slide-out actuator and encoder count rates for determining the speed of each slide-out actuator. The encoder may be a quadrature encoder.

DETAILED DESCRIPTION

Figure 1:
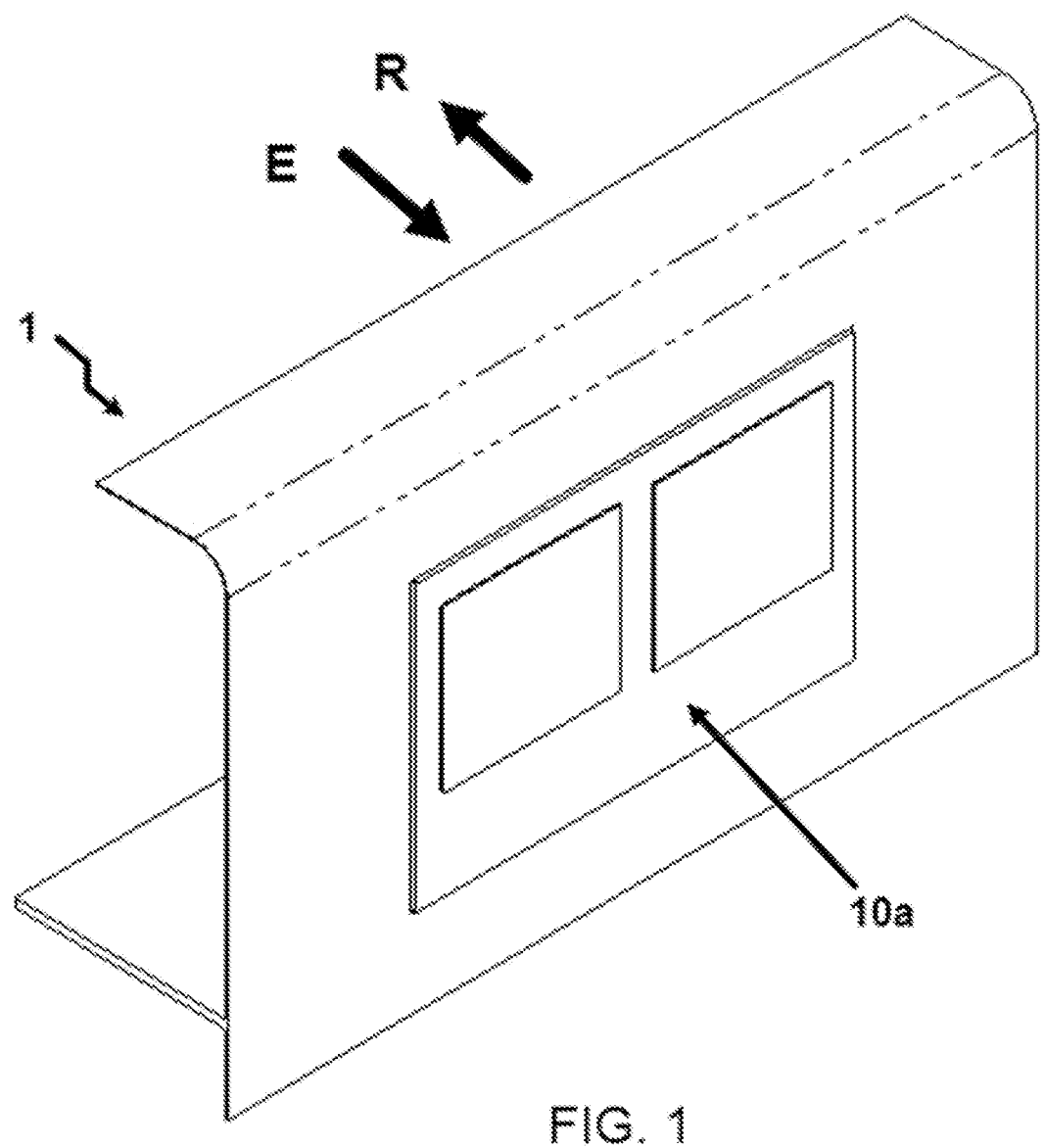
FIG. 1 is a perspective cut-away view, showing a slide-out room in a fully retracted position when viewed from the exterior of a mobile living space.
Figure 2:
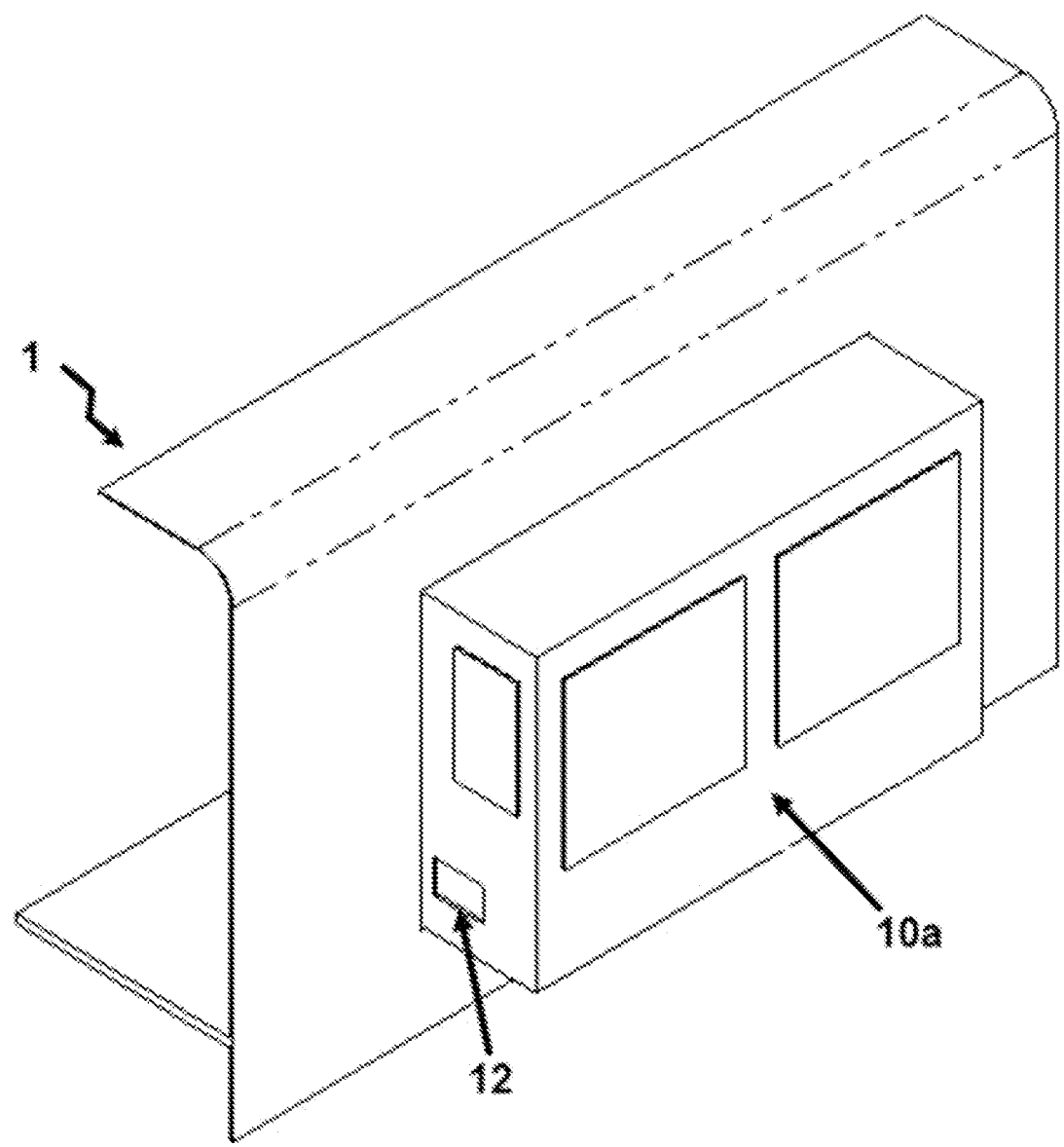
FIG. 2 is a perspective cut-away view, showing a slide-out room in a fully extended position when viewed from the exterior of a mobile living space.
Figure 3:
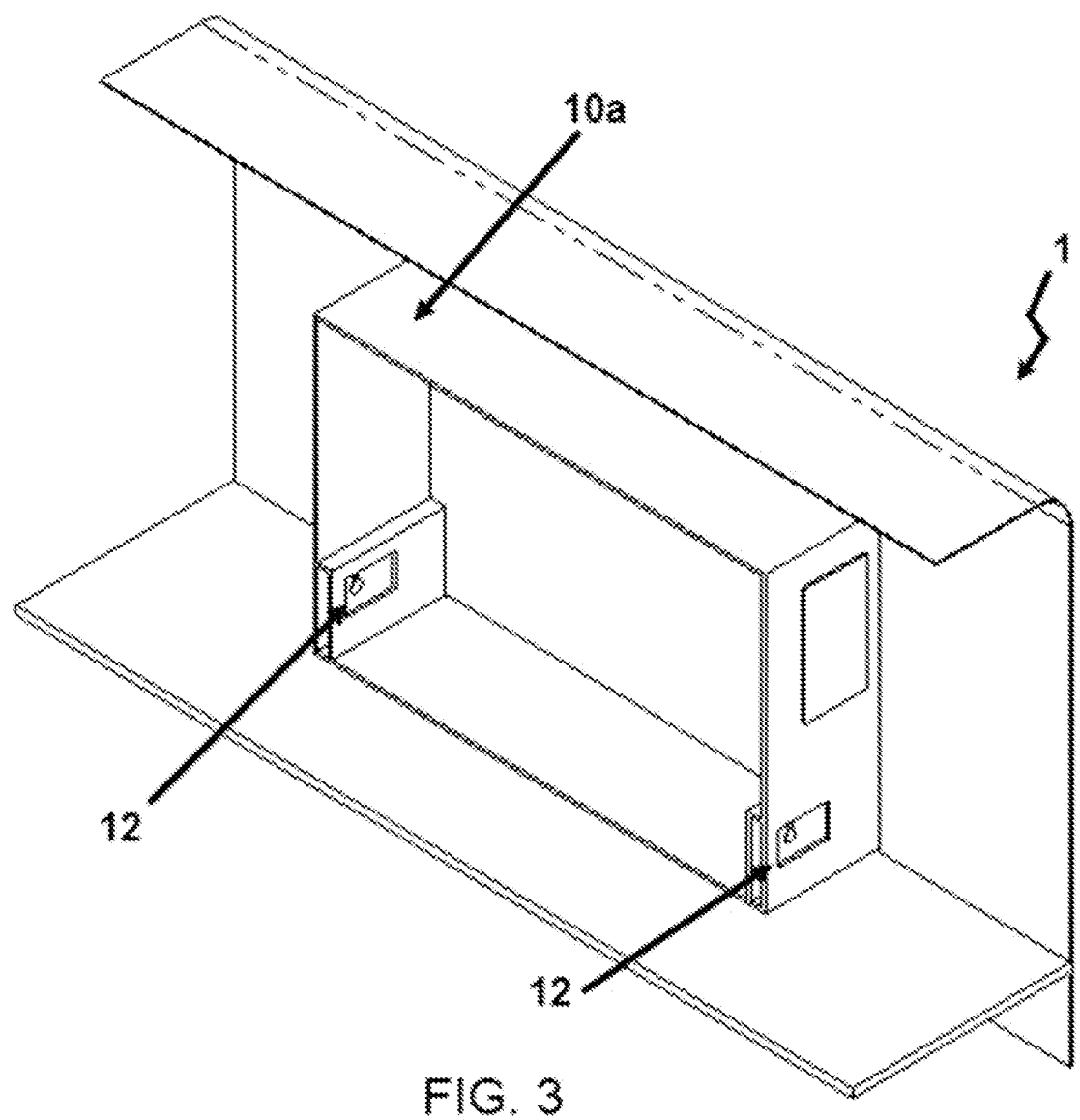
FIG. 3 is a perspective cut-away view, showing a slide-out room in a fully retracted position when viewed from the interior of a mobile living space.
Figure 4:
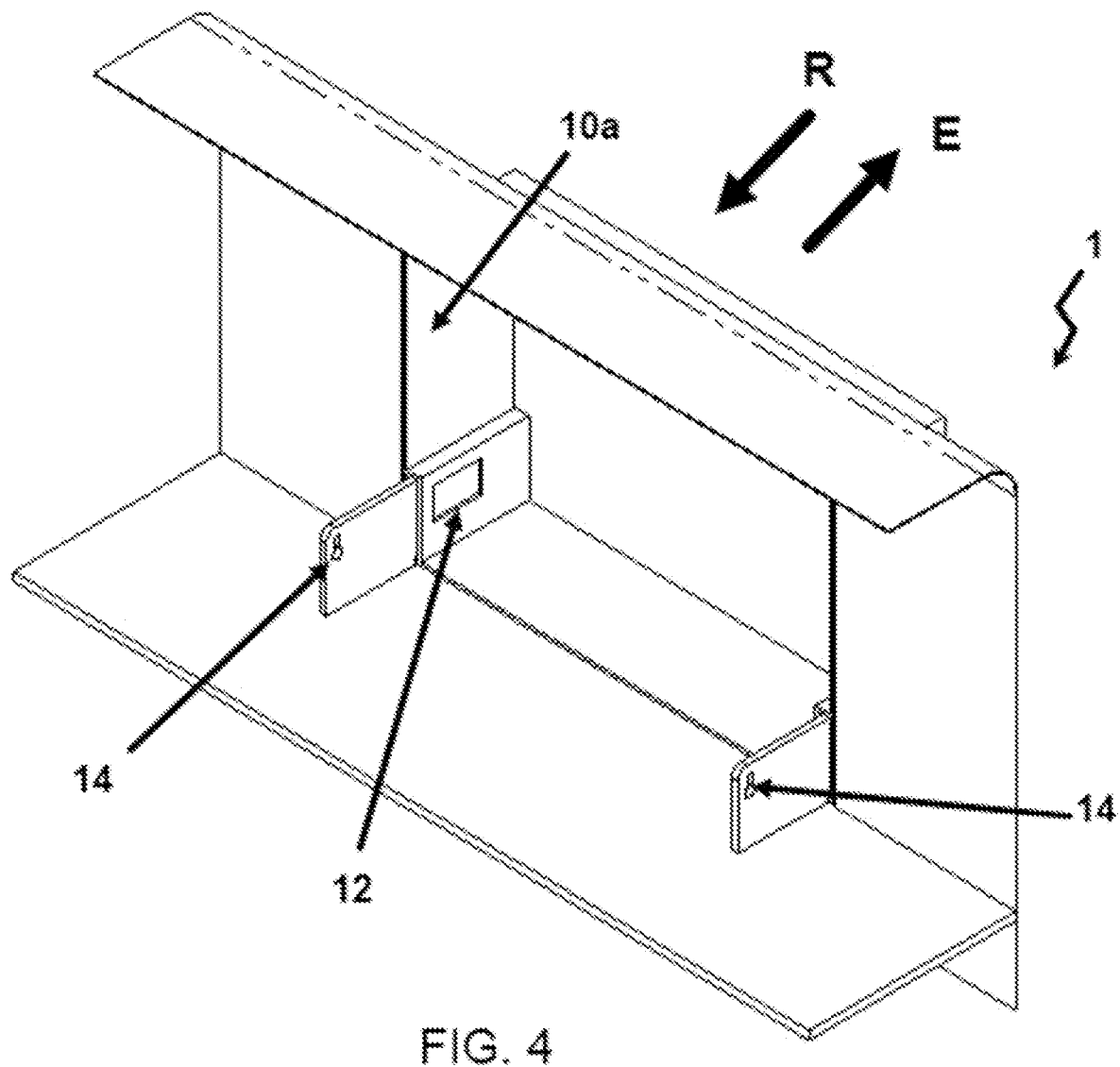
FIG. 4 is a perspective cut-away view, showing a slide-out room in a fully extended position when viewed from the interior of a mobile living space.

A typical slide-out room has at least two actuators for actuating at least two slide-out assemblies, for moving each side of the slide-out room. For example, as shown in FIGS. 1-4, slide-out room 10a has two slide-out assemblies 12, 12 actuated by actuators 14, 14. Larger slide-out rooms may require more than two slide-out assemblies and corresponding actuators, however, it will be appreciated that the operation and principles of the slide-out control system, as described herein with respect to two-actuator systems, is equally applicable to slide-out rooms having three or more slide-out assemblies and corresponding actuators.

Actuator Synchronization

In one aspect of the present disclosure, the actuation of the actuators 14, 14 and slide-out assemblies 12, 12 is synchronized to avoid one actuator and assembly moving too far ahead or behind the other actuator and assembly. One method of synchronization involves monitoring, by the controller, the position of each of the slide-out actuators 14, 14. The controller is in electronic communication with a position sensor, which for example may be an encoder, such as a linear encoder or a rotary encoder, for detecting the position and speed of each actuator during an extension or retraction operation. As will be appreciated by a person skilled in the art, any type of sensor for detecting and monitoring the position of each actuator may be utilized in the systems and methods described herein and are intended to be included in the scope of the present disclosure. Other examples of position sensors include, but are not limited to, absolute position sensors and photoelectric sensors.

In a system utilizing an encoder as the position sensor for monitoring the position of the actuator, the electronic controller monitors the encoder count of each of the actuators. When the controller detects a difference between the position of each actuator, based on a difference in the encoder counts of each actuator, the speed of the leading actuator is linearly reduced. In other words, as one actuator gets farther ahead, it is slowed down at a greater rate. Advantageously, the Applicant has found that by linearly reducing the speed of the actuator that is too far ahead, the lagging actuator is able to catch up while avoiding sudden, large changes in the speed of the leading actuator.

Furthermore, the Applicant has found that this synchronization method is more power efficient, because if the leading actuator is ahead (within a certain distance of the lagging actuator), it may usefully "pull along" the lagging actuator, thus providing a power advantage to the system. Because the resistance to a retraction or extension movement of each actuator may vary due to a number of factors, such as manufacturing tolerances in the slide-out room, differences in the load on the actuator and obstructions in the path of the actuator, if the same power is supplied to each actuator then the actuator which is ahead must be encountering greater resistance than the other actuator. Thus, if the leading actuator is maintained in a position that is slightly ahead of the lagging actuator, then the leading actuator pulls along the lagging actuator. In some embodiments, the leading actuator is maintained in the ahead position by linearly reducing the leading actuator's speed so that it does not advance too far ahead of the lagging actuator. If the leading actuator were to get too far ahead of the lagging actuator, the Applicant has found this misalignment may twist the slide-out room and result in binding the actuators. The Applicant found the control method, of linearly reducing the speed of the leading actuator, to offer power advantages as compared to a PID controller or other control algorithms.

Should the position of the lagging actuator become equal to the position of the leading actuator, the speed of the two actuators may once again be matched so that the two actuators continue executing the extension or retraction operation in synch, as the case may be. Linearly reducing the speed of the actuator that is too far ahead may occur, for example, by using a pulse-width modulation controller, whereby the speed of the actuator that is ahead is reduced by decreasing the duty cycle of the electric motor that forms part of the actuator.

Optionally, if the difference in position between the two actuators is equal to or greater than a pre-set maximum difference, the synchronizing method may further comprise the steps of stopping the leading actuator, whereby the lagging actuator catches up to the stopped, leading actuator until the difference in position of the two actuators is less than the pre-set maximum difference. Then, the one stopped actuator is re-started, such that the two actuators once again continue executing the extension or retraction operation in synch with one another.

In systems having a pre-set maximum difference threshold, the leading actuator is linearly slowed down based on how close the leading actuator is to reaching the pre-set maximum difference. By way of an illustrative example that is not intended to be limiting, if the maximum difference is defined as 500 encoder counts, and the leading actuator is ahead of the lagging actuator by 100 encoder counts (or in other words, ahead by 20% of the maximum difference), then the leading actuator will have its speed reduced by 20%. In the same example, if the leading actuator is ahead of the lagging actuator by 150 encoder counts (or in other words, ahead by 30% of the maximum difference), then the leading actuator will have its speed reduced by 30%. And if the leading actuator is 500 encoder counts ahead of the other actuator, thereby reaching the pre-set maximum difference, then the control system stops the leading actuator until the lagging actuator catches up; in some embodiments, by reaching the same position as the ahead actuator; and in other embodiments, by reaching some position differential that is less than the maximum difference, such as the lagging actuator reaching a position 100 encoder counts behind the leading actuator.

Although particular methods for synchronizing the speed and movement of the at least two actuators and slide-out assemblies are described above, it will be appreciated that other methods for synchronizing the speed and movement of the at least two slide-out actuators may be employed with the dynamic end stop updating methods described below, and such alternative synchronizing systems and methods also fall within the scope of the present disclosure.

Dynamically Updated End Stop Position

In another aspect, the end stop position of each actuator of a slide-out assembly may be dynamically updated, for example at the completion of an extension operation. In a two-actuator system where the extension of the two actuators is synchronized, the electronic controller stores in a memory the distance travelled by each actuator to reach the end stop during the previous extension operation. The distance travelled by each actuator may be determined, for example, by tracking the encoder counts of each actuator, or using other position sensors to track how far each actuator has travelled during an extension operation. As each actuator 14 approaches its end stop position, defined as the position the actuator travels to when the actuator is fully extended, the electronic controller will detect a decreased speed of the actuator, such as by detecting a decreased encoder count rate. Decreased actuator speed occurs because, as the actuator approaches its limit of extension, the actuator encounters resistance and the actuator, therefore, begins to slow down. The decreased actuator speed may have a pre-defined end-stop threshold, defined as an actuator speed that has slowed down to such an extent that it indicates the actuator is approaching its limit of extension. When the end-stop threshold of the actuator is reached, the controller stops the actuator, signifying the end of the extension operation.

Once both actuators have been stopped by the electronic controller, the travel distances of each actuator, which for example may be determined by the encoder counts of each actuator, are compared to the last saved travel distance of each actuator. In some embodiments, if there is any difference between the last saved travel distance and the present travel distance of the actuator, the end stop position (or in other words, travel distance) of that actuator is updated to reflect the present travel distance measured for that actuator, thereby resulting in the dynamic updating of the end stop position for that actuator. Preferably, the end stop position of an actuator is only updated if the actuators extended from a fully retracted position, which avoids having the controller update the end stop position in situations where the slide-out has not been extended from a fully retracted position, which may occur for example when the user has stopped the actuators midway through an extension operation so as to avoid an obstacle, and then re-starts the actuators after the obstacle has been removed. Other situations in which an actuator and slide-out assembly may not commence an extension operation from the fully retracted position include where an object, such as a shoe, may have fallen into the slide out assembly, thereby causing the actuators to stop before completing an extension or retraction operation, and requiring the operator to clear the object from the slide-out assembly before completing the extension or retraction operation.

In a preferred embodiment, if the controller determines the end stop position is to be updated, the end stop position is updated by increasing or decreasing the last saved travel distance by a coarse or fine amount, rather than simply updating the end stop position to reflect the position of the actuator where it last stopped. By limiting the adjustment of an end stop position to a pre-defined amount, the control system avoids making uncontrolled or drastic changes to the dynamically updated end stop position. The coarse adjustment amount provides a way for the system to quickly learn and dynamically update the travel distance in a new installation so that the updated travel distance approximates the actual limit of extension of the actuator. The fine adjustment amount provides a way for the system to finely adjust the end position.

By way of illustrative example, not intended to be limiting, if the controller determines that the distance travelled by the actuator is 5500 encoder counts (approximately 5.5 inches or 14 cm) more than the last saved actuator travel distance, and the coarse adjustment amount is 1000 counts (approximately 1 inch or 2.5 cm), the system will adjust the new travel distance by adding 1000 encoder counts (or approximately 1 inch or 2.5 cm) to the last saved travel distance. In another example, if the controller determines that the distance travelled by the actuator is 500 counts (around 0.5 inches or 1.3 cm) more than the last saved actuator travel distance, and the fine adjustment amount is 200 counts (approximately 0.25 inches or 0.6 cm), the system will adjust the new travel distance by adding 200 encoder counts (or approximately 0.25 inches or 0.6 cm) to the last saved travel distance. In this instance, the control system adjusts the new travel distance by the fine amount, because the difference between the travel distance and the last saved travel distance was less than the coarse adjustment amount.

In some embodiments, the home position of the actuators may also be updated at the end of a retraction operation. For example, the control system may be configured to monitor the speed of the slide-out actuators during a retraction operation and detect when the speed of each slide-out actuator is decreased, using the position sensor that is in electronic communication with the controller. As with the extension operation, the actuators will begin to slow down during a retraction operation as they begin to approach their home position (defined as the position of the actuator when it is fully retracted), because each actuator encounters resistance as the actuator approaches the limit of its retraction. A home position threshold, defined as the speed of the actuator that indicates the actuator is approaching its home position, is programmed into the controller. When the speed of the actuator slows down to the point that it reaches its home position threshold, the controller stops the slide-out actuator. As with the end stop position of the actuator, which may change from the last-saved end stop position when an extension operation is completed, the home position of the actuator may also change from the last saved home position of the actuator when a retraction operation is completed. To account for these variances in the home position of the actuator, the control system is configured to update the home position to the home position reached at the end of the retraction operation; for example, in some embodiments utilizing an encoder as the position sensor, the encoder count of the home position is updated by re-setting the encoder count to zero at the completion of the retraction operation.

Soft Stop Function

In another aspect of the present disclosure, in some embodiments the control system is programmed to slow down the actuator as it approaches the end stop position (at the end of an extension operation), or as it approaches the home position (at the end of a retraction operation). In such embodiments, for example, the controller tracks the position of the actuator as it travels towards the end stop position, the end stop position defined by the last saved travel distance for the actuator. At a short distance prior to the end stop position, referred to herein as the "near-end stop position", the controller slows down the actuator; for example, by reducing the duty cycle of the PWM by 30%, when the actuator is approximately one inch or 100 encoder counts away from the predicted end stop, the predicted end stop position determined by the last saved travel distance for that actuator. Therefore, the actuator travels at a slower rate towards the end stop as it moves between the near-end stop position and the defined end stop position, which may advantageously reduce the wear on the actuator and the slide-out assembly components, as compared to having the actuator travel at full speed (or 100% duty cycle) to the end stop. In some embodiments, the controller may slow down the actuator by reducing the duty cycle of the PWM by up to 50% when the actuator reaches the near-end stop, and the near-end stop may be defined as less than or greater than three inches from the end stop position; the examples for implementing the soft stop function, provided above, are not intended to be limiting.

Once the controller has slowed down the actuator, a short distance before it reaches the end stop, the controller continues to monitor the speed of the actuator (in some embodiments, as determined by the encoder count rate) to detect when the actuator slows down, and detects the end stop when the end-stop threshold of the actuator speed is reached. As described above, the distance travelled by the actuator to reach the detected end stop position may then be compared to the last saved travel distance of the actuator, and if there is a difference between the present distance travelled by the actuator and the last saved travel distance, the controller updates the end stop position by increasing or decreasing the last saved travel distance of the actuator by the set amount, which then becomes the new end stop position that is stored in a memory of the controller.

It will be appreciated that the soft stop feature, described above, may be employed when the slide-out actuator is operating in either direction. Although the above description of the soft stop feature refers to an extension operation, with the actuators 14 and the slide-out assemblies 12 moving in direction E, the soft stop feature may also be applied during a retraction operation, where the actuators 14 and slide-out assemblies 12 are moving in direction R to retract the slide-out room 10a, 10b into the vehicle 1, with a "near-home position" being defined as the position of the actuator that is a short distance away from the last saved home position of the actuator. During a retraction operation, a retraction home position may be defined as an encoder count of zero, indicating the actuator 14 is fully retracted.

Method

Figure 5:
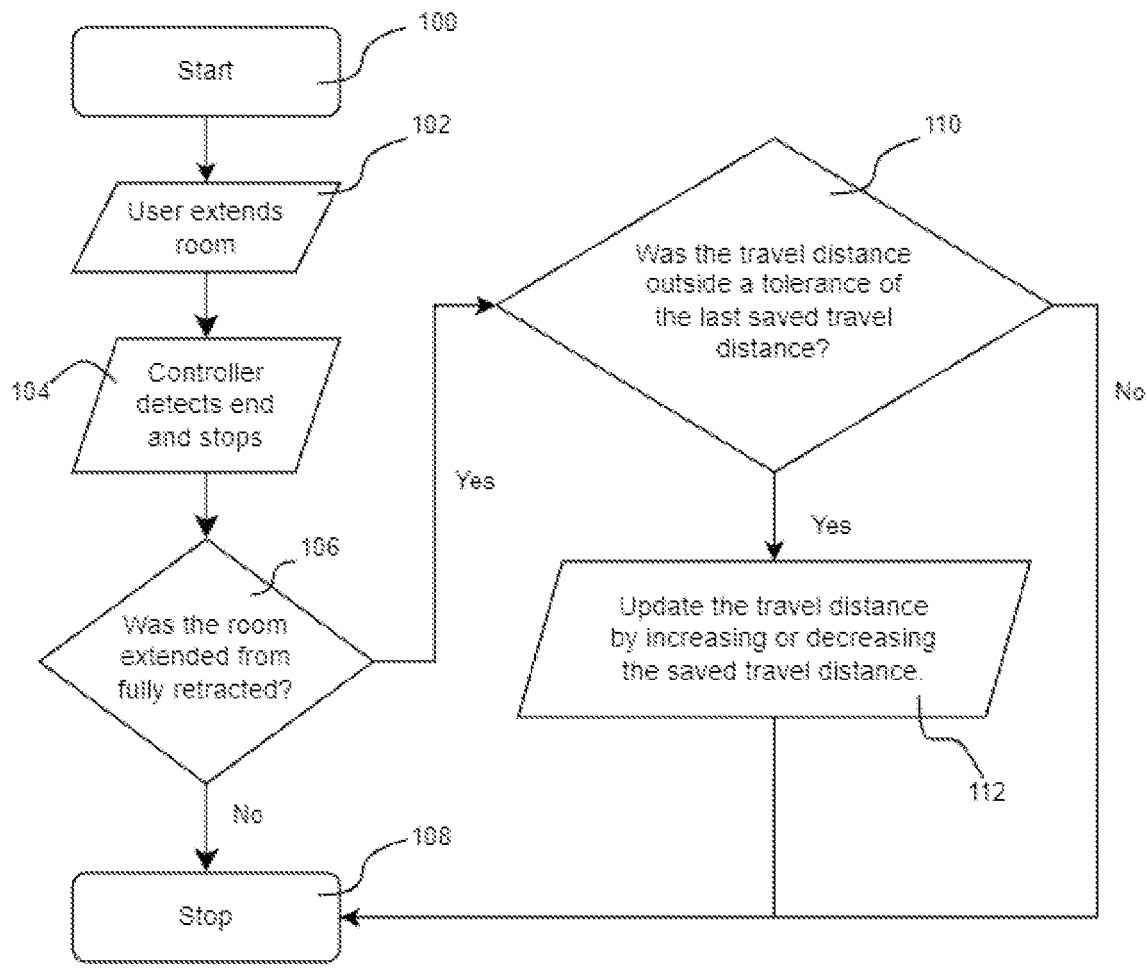
FIG. 5 is a logic flow diagram of an embodiment of the method for controlling the slide-out actuators, in accordance with the present disclosure.

An illustrative embodiment of the methods described herein is shown in FIG. 5. At the start 100 of an extension operation for a slide-out room, the user or operator commands the control system to begin extending the slide-out room at step 102. When the system's controller detects the end stop position by detecting that the actuator speed is reaching the end stop position threshold speed, the control system stops the actuator at step 104. At step 106, the control system then queries whether the actuators were extended from a fully retracted position. If the actuators were not extended from a fully retracted position, the method ends at step 108 without updating the end stop position. However, if the control system determines the actuators were extended from a fully retracted position, then the controller compares the present travel distance of each actuator against the last saved travel distance of each actuator, at step 110. If the difference between the present travel distance and the last saved travel distance of the actuator is determined to exceed a tolerance threshold amount, then the last saved travel distance of the actuator is updated to a new travel distance, by either decreasing or increasing the last saved travel distance by a set amount, which may be a coarse amount or a fine amount, at step 112. Then, during a subsequent extension operation, this updated travel distance of the actuator is used to compare against the travel distance of that actuator during a subsequent extension operation, for the control system to determine if the end stop position needs to be updated after the subsequent extension operation has been completed. On the other hand, if the difference between the present travel distance of the actuator and the last saved travel distance of that actuator does not exceed a given tolerance threshold, as determined at step 110, then the method comes to an end without updating the end stop position, at step 108.

What is claimed is:

1. A method for automatically detecting and dynamically updating a stop position of a slide-out assembly, the method comprising the steps of:
    a) synchronizing, by a controller, a movement of each of at least two slide-out actuators during an operation;
    b) when the at least two slide-out actuators approach a last saved travel distance defining the stop position, detecting, by the controller in communication with a position sensor, a decreased speed of each slide-out actuator of the said at least two slide-out actuators;
    c) stopping, by the controller, each of the at least two slide-out actuators when the speed of each slide-out actuator reaches a stop position threshold;
    d) comparing, by the controller, a travel distance of the at least two slide-out actuators to the said last saved travel distance;
    e) updating, by the controller, the said last saved travel distance to a new saved travel distance, if the travel distance is greater than or less than the last saved travel distance.

2. The method of claim 1, further comprising the steps of: prior to step (c) of claim 1, detecting, by the controller, a near-stop position of the at least two slide-out actuators, the near-stop position having a travel distance less than the said last saved travel distance of the at least two slide-out actuators; and
    reducing, by the controller, the speed of each of the at least two slide-out actuators as the at least two slide-out actuators travel between the said near-stop position and the last saved travel distance.

3. The method of claim 2, wherein the step of reducing the speed of each of the at least two slide-out actuators comprises controlling the speed of each actuator of the at least two slide-out actuators with a pulse-width modulation controller, wherein the speed is reduced by decreasing a duty cycle of the said pulse-width modulation controller.

4. The method of claim 3, wherein the duty cycle of the pulse-width modulation controller is decreased by 30% to 50% of a full power duty cycle.

5. The method of claim 1, wherein the step of updating the last saved travel distance to a new saved travel distance comprises increasing or decreasing the last saved travel distance by a set amount.

6. The method of claim 5, wherein the set amount includes a coarse adjustment amount and a fine adjustment amount, the coarse adjustment amount being greater than the fine adjustment amount, and wherein when a differential between the travel distance and the last saved travel distance exceeds the coarse adjustment amount as determined at step (d), the last saved travel distance is updated to the new saved travel distance by increasing or decreasing the last saved travel distance by the coarse set amount, and wherein, when the differential is equal to or less than the coarse adjustment amount as determined at step (d), the last saved travel distance is updated to the new saved travel distance by increasing or decreasing the last saved travel distance by the fine adjustment amount.

7. The method of claim 1, wherein prior to performing step (d) of comparing a travel distance of the at least two slide-out actuators to a last saved travel distance, performing a step of determining, by the controller, whether each actuator of the at least two slide-out actuators was extended from a fully retracted position, and then only proceeding to step (d) if each actuator was extended from the fully retracted position.

8. The method of claim 1, wherein the step (a) of synchronizing a movement of each of at least two slide-out actuators during an operation comprises:
   i. monitoring a position of each of the at least two slide-out actuators by a position sensor for detecting the distance travelled by each actuator;
   ii. detecting, by the controller, a difference in the position of each said actuator compared to the other actuator;
   iii. when said difference is detected, linearly reducing, by the controller, a speed of a leading actuator of the said at least two actuators that is ahead of a lagging actuator of the at least said two actuators.

9. The method of claim 8, wherein when the said difference is equal to or greater than a maximum threshold difference, then the method further comprises the steps of:
   stopping, by the controller, the leading actuator until the said difference is less than the maximum threshold difference; and
   re-starting, by the controller, the leading actuator when the said difference is less than the maximum threshold difference.

10. A control system for performing the method of claim 1 of detecting and dynamically updating an end stop position of a slide-out assembly, the slide-out assembly comprising at least two slide-out actuators, the system comprising:
   the controller;
   the position sensor operatively connected to each slide-out actuator of the at least two slide-out actuators for monitoring a distance travelled by each said actuator, each position sensor in electronic communication with the controller;
   a memory configured to store position data of each position sensor, the memory in electronic communication with the controller;
   wherein the controller synchronizes a movement of each actuator of the at least two slide-out actuators and monitors a position and a speed of each slide-out actuator; and
   wherein the controller stops each actuator when the speed of each said actuator reaches an end stop position threshold; and
   wherein the controller compares the travel distance of each said actuator to a last saved travel distance of each actuator retrieved from the memory and updates the last saved travel distance to a new travel distance if the new travel distance is greater than or less than the last saved travel distance.

11. The system of claim 10 wherein the controller comprises a pulse-width modulator, and wherein when each slide-out actuator approaches a near-end position, the near-end position defined by a near-end travel distance that is less than the last saved travel distance of each actuator, the pulse-width modulator reduces the duty cycle of each slide-out actuator so as to reduce the speed of the slide-out actuator as it travels between the near-end position and the last saved travel distance.

12. The system of claim 10 wherein the position sensor is selected from a group comprising: a rotary encoder, a linear encoder, an absolute position sensor, a photoelectric sensor.

13. The system of claim 10 wherein the position sensor is an encoder, and the position data includes encoder counts for determining the position and travel distance of each slide-out actuator and encoder count rates for determining the speed of each slide-out actuator.

14. The system of claim 13, wherein each encoder is a quadrature encoder.

15. The method of claim 1 wherein the operation is an extension operation for extending the at least two slide-out actuators from a retracted position to an extended position.

16. The method of claim 1 wherein the operation is a retraction operation for retracting the at least two slide-out actuators from an extended position to a retracted position.

* * * * *